Dec. 10, 1968  D. R. KIMBERLIN ET AL  3,415,139
VEHICLE STEERING COLUMN ASSEMBLY INCLUDING MOLDED SPACER MEANS
Filed Sept. 26, 1966

INVENTORS
Dan R. Kimberlin, &
Lawrence J. Mahalak
D. L. Ellis
ATTORNEY

United States Patent Office 3,415,139
Patented Dec. 10, 1968

3,415,139
VEHICLE STEERING COLUMN ASSEMBLY INCLUDING MOLDED SPACER MEANS
Dan R. Kimberlin and Lawrence J. Mahalak, Saginaw, Mich., assignors to General Motors Corporation, Detroit, Mich., a corporation of Delaware
Filed Sept. 26, 1966, Ser. No. 581,967
5 Claims. (Cl. 74—492)

ABSTRACT OF THE DISCLOSURE

The steering shaft and support jacket components of an energy absorbing steering column are provided at the column lower end with firm connection for transfer of axial force directly between the steering shaft and the support jacket by means of an intermediate spacer construction seated therebetween and including an in situ molded spacer element.

---

This invention relates generally to vehicle steering column assemblies and more particularly to means for firmly axially locating one steering column part relative to another.

The invention has most particular relation to collapsible steering column assemblies of the type including one or more telescopic operating parts such as a steering shaft or a transmission selector operating tube which have their telescopic sections joined by shearable connectors set for failure at some predetermined axial loading on the column assembly as might be occasioned in a vehicle collision. These operating parts typically are enclosed or housed by a support or mast jacket mounted to the vehicle body in a manner to take such axial loading on the column assembly. To avoid accidental failure of the shearable connectors of the operating parts, as during rough handling or shipping prior to assembly in the vehicle, it is desirable that the parts be firmly axially connected or located relative to the load bearing support jacket in a manner to have such accidental shocks imposed directly on the jacket. Due to the fairly high precision locating of these parts relative to the support jacket as must obtain to avoid even a partial failure of the shear connectors, and due to the manufacturing tolerance conditions that normally occur in the mass manufacture of such assemblies, it is desirable that a custom fabricated precision connection be provided for each individual steering column assembly that is produced in mass manufacture.

Accordingly, it is the primary object of this invention to provide a custom fabricated axial locating means for the columnar parts of a steering column assembly. It is another object of this invention to provide axial locating means for a steering column assembly custom fabricated for each individual assembly in mass manufacture through the use of moldable material. Still another object of this invention is to provide custom fabricated axial locating means for steering column parts including a pair of cavity forming members each axially located on a respective one of two steering column parts and together defining a cavity suitable for the molding therein of a spacer of thermoplastic or similar moldable material serving to firmly axially locate the steering column parts relative to each other.

These and other objects, features and advantages of the invention will be readily apparent from the following specification and the drawings wherein.

Figure 1:
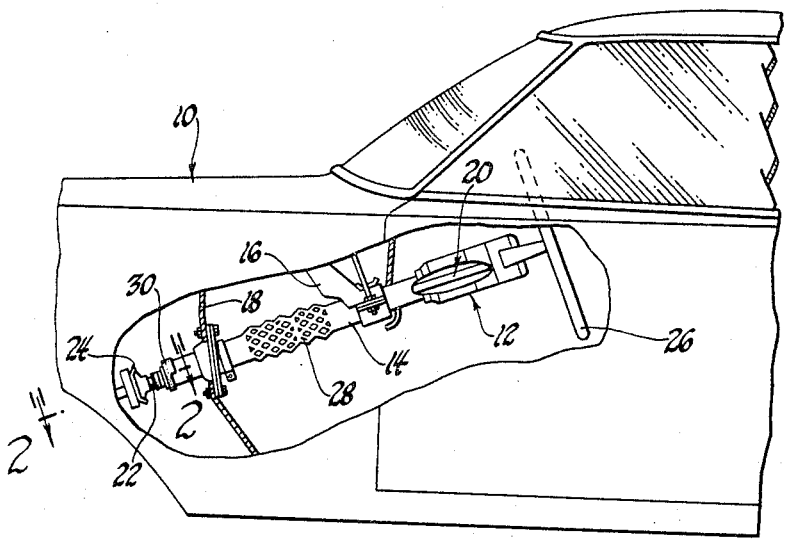
FIGURE 1 is a fragmentary partially broken away elevational view of an automotive vehicle body including a steering column assembly and axial locating means therefor according to this invention.

Referring now particularly to FIGURE 1 of the drawings, there is shown installed within a vehicle body 10 a vehicle steering column assembly designated generally as 12. Steering column 12 is of the collapsible energy absorbing type and includes an energy absorbing mast or support jacket 14 releasably mounted adjacent its upper end to the instrument panel structure 16 of the body by a bracket assembly and fixed adjacent its lower end to the fire wall structure 18 of the body. Rotatably supported within mast jacket 14 is a telescopic steering shaft indicated at 20, the lowermost section 22 of which extends upwardly from a spline connection with a flexible coupling 24 associated with the vehicle steering gear, not shown. At its upper end, the steering shaft mounts a steering wheel 26. Other column members, such as a telescopic transmission shifter tube, may also be rotatably supported within the mast jacket 14.

For a detailed description of the type of steering column assembly shown herein, reference may be had to the copending Wight et al. application Ser. No. 546,312, now U.S. Patent No. 3,373,629 assigned to General Motors Corporation. Generally, however, the mast jacket 14 includes an energy absorbing section 28 operative upon application of a predetermined axially directed force either rearwardly from the steering gear or forwardly from the steering wheel 26 to allow collapse or end-to-end shortening of the column and to absorb the force loading in a manner to provide controlled resistance to such collapse. The various telescopic sections of steering shaft 20 are joined by shearable connecting pins or the like set for failure at some predetermined axial loading on the column less than that required for failure of section 28 of the mast jacket. Inasmuch as the axial loading on the column to be absorbed by section 28 is applied to the column at the ends of the steering shaft adjacent coupling 24 and steering wheel 26, it is necessary to provide axial connections or abutments between the shaft and the mast jacket 14 to directly transfer such force loading to the mast jacket. Further, it has been found that such axial connections are needed to prevent accidental failure or partial failure of the shearable connectors in the steering shaft as may arise in manufacture or shipping of the steering column prior to installation in the vehicle, such as by dropping the column on the exposed splined lower end of shaft section 22. These connections must be firm and precise to avoid even a partial failure of the connectors, and it is exceedingly difficult to obtain such precision with conventional locators or spacers in view of the tolerances on the lengths of these steering column parts and the axial stack-up of these tolerances when the parts are assembled. The axial locating means of this invention answers to these difficulties.

Figure 2:
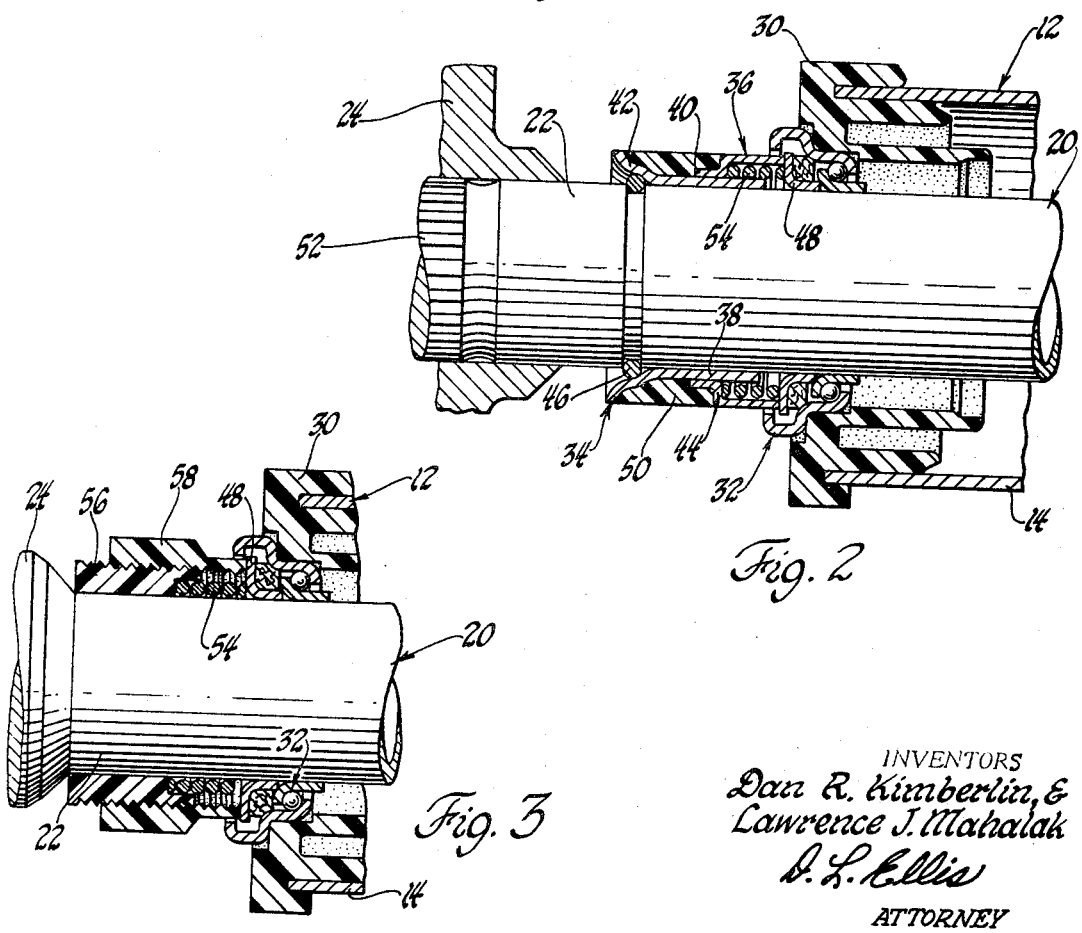
FIGURE 2 is an enlarged sectional view taken generally along the plane indicated by lines 2—2 of FIGURE 1.

Referring now to FIGURE 2, the lower end of the mast jacket 14 mounts an adaptor plug 30 which in turn carries a ball bearing assembly 32 rotatably supporting shaft section 22 within the mast jacket. The locating means of this invention includes in a preferred embodiment a pair of annular collars 34 and 36 including axially extending portions 38 and 40 telescopically relating the collars. Collar 34 includes a radially outwardly extending annular flange 42, and collar 36 has merged with its axial portion 40 a radial wall portion 44. The collar 34 is abutted at flange 42 with a snap ring 46 seated in a groove of the shaft section 22. Collar 36 is engageable with the inner race 48 of ball bearing assembly 32.

In assembly, the steering shaft is mounted within the mast jacket 14, firstly to have firm axial abutment at its upper end with the mast jacket in a manner not shown. The slidably related collars 34 and 36 are then placed over the lower end of shaft section 22 and the snap ring 46 is installed in its groove. The collars are then displaced axially apart from one another to engage snap ring 46 and the inner race 48. The annular cavity defined by the flange 42 and wall 44 is then closed by injection dies and filled with thermoplastic or similar moldable material, the material being injected under such pressure as to provide a predetermined amount of axial preloading on the ball bearing assembly 32. The molded spacer 50 thus provided is operative once cured or set to establish a rigid axial force transferring connection between shaft section 22 and mast jacket 14. Should the steering column assembly be dropped on the exposed end 52 of the steering shaft during manufacture or shipping, the shock loading on the column is transferred directly through the spacer 50 and ball bearing assembly 32 to the mast jacket 14 to have the latter absorb the shock and prevent failure of the steering shaft shear connectors. Likewise, once installed within the vehicle, any axial force loadings on the column must flow between shaft section 22 and mast jacket 14 through the spacer 50.

As shown in FIGURE 2, a coil compression spring 54 is seated between radial wall 44 and inner race 48 to assume a substantially fully flattened or compressed state under the pressure injection of the material forming the spacer 50. Depending upon the material used, spacer 50 may undergo some slight amount of contraction when setting or curing, and spring 54 will maintain preload on ball bearing assembly 32 as the collar 36 is permitted to disengage slightly away from inner race 48.

It is apparent from the foregoing that the axial locating means of this invention provides highly efficient and adaptable means for providing precision axial abutment between the steering shaft and the mast jacket, even considering the axial tolerances that must occur in the mass manufacture of the steering column. For whatever variation in axial gap between inner race 48 and snap ring 46 that is encountered from assembly to assembly, the injection molding of the spacer 50 between these parts for each individual steering column assembly accommodates the inconsistency and provides a precision custom made axial connection.

Figure 3:
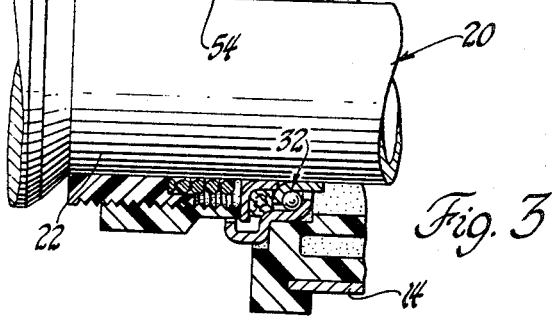
FIGURE 3 is a view similar to FIGURE 2 showing modified axial locating means.

In FIGURE 3, there is shown a modification of an axial locating construction for steering column 12, with like numerals referring to like parts. In this construction, a pair of threadably interconnected sleeve and nut members 56 and 58 are disposed about shaft section 22 axially between the flex coupling 24 and the inner race 48. After assembly of the steering shaft 22 within the mast jacket 14, the nut 58 is threaded on the sleeve 56 in a direction to extend axially and provide firm axial abutment of the opposite ends of the sleeve and the nut against the flex coupling 24 and inner race 48 respectively.

Having thus described the invention, what is claimed is:

1. Vehicle steering column apparatus comprising a support jacket member, an operating column member mounted generally concentrically within said jacket member, means defining a first wall extending radially of one of said members at a predetermined axial location with respect thereto, means defining a second wall extending radially of the other of said members at a predetermined axial location with respect thereto, said walls being juxtaposed and axially spaced by a distance variable within a finite assembly tolerance range to define a cavity extending axially of said members, and a molded in situ spacer element within said cavity and engaged with said first and second walls to provide axial force transferring connection between said members.

2. Apparatus as recited in claim 1 wherein said walls extend annularly about one of said members, said cavity being an annular channel.

3. Apparatus as recited in claim 1 wherein said means defining said walls include a pair of annular collars mounted to one of said members for relative movement axially thereof to a plurality of spaced relative positions, and means for locating each of said collars axially on a respective said member at said predetermined axial locations of said walls.

4. Apparatus as recited in claim 3 wherein said locating means include bearing means having fixed axial location on one of said members and journalling said members for rotation of one relative to the other.

5. Apparatus as recited in claim 4 including a preload spring interposed between one of said collars and said bearing means.

References Cited

UNITED STATES PATENTS 2,686,091   8/1954   Young.

MILTON KAUFMAN, *Primary Examiner.*